United States Patent [19]

Heidacker

[11] 3,914,937

[45] Oct. 28, 1975

[54] CARBURETED AIR PREHEATER STOVE

[75] Inventor: Walter C. Heidacker, Bloomfield Hills, Mich.

[73] Assignee: General Motors Corporation, Detroit, Mich.

[22] Filed: Sept. 3, 1974

[21] Appl. No.: 502,412

[52] U.S. Cl. .................. 60/298; 60/320; 123/122 D
[51] Int. Cl.² ..................... F02B 75/10; F02M 31/00
[58] Field of Search ............ 60/298, 320; 123/122 D

[56] References Cited
UNITED STATES PATENTS

| | | | |
|---|---|---|---|
| 2,781,032 | 2/1957 | Sebok | 123/122 D |
| 2,853,065 | 9/1958 | Stearns | 123/122 D |
| 3,698,873 | 10/1972 | Kohayakawa | 60/298 |
| 3,809,019 | 5/1974 | Stoltman | 123/122 D |

*Primary Examiner*—Douglas Hart
*Attorney, Agent, or Firm*—Ronald L. Phillips

[57] ABSTRACT

An internal combustion rotary engine having a can type catalytic converter secured up close to the engine directly to the exhaust manifold is provided with a can type stove closed at only one end that fits over an upper end of the converter and is secured in place without requiring fasteners and is connected at the closed upper end by a tube with the air inlet of the engine's carburetor so that fresh air is directed through the lower open end of the stove and then along the side and over the end of the converter and is heated thereby prior to delivery to the carburetor.

2 Claims, 4 Drawing Figures

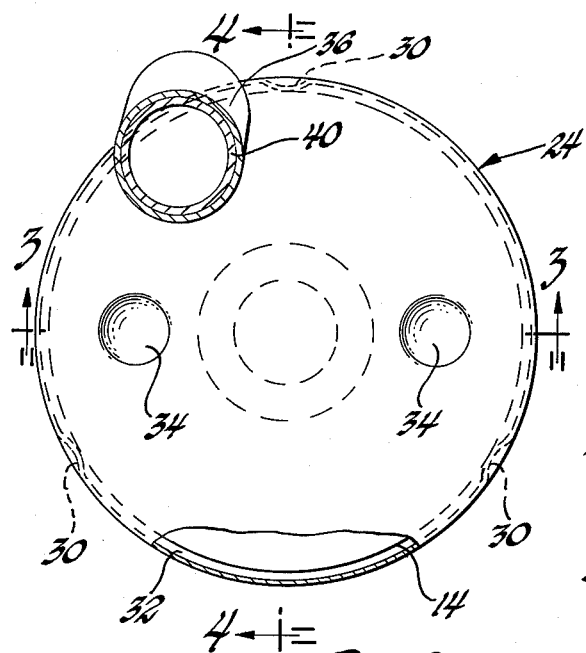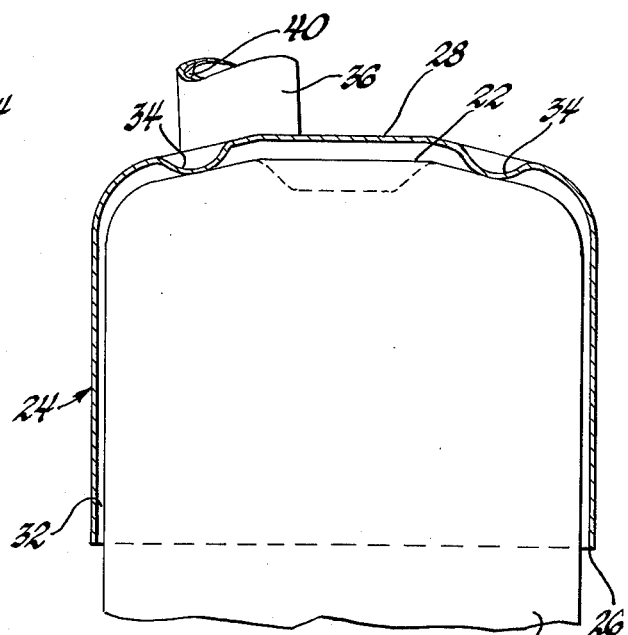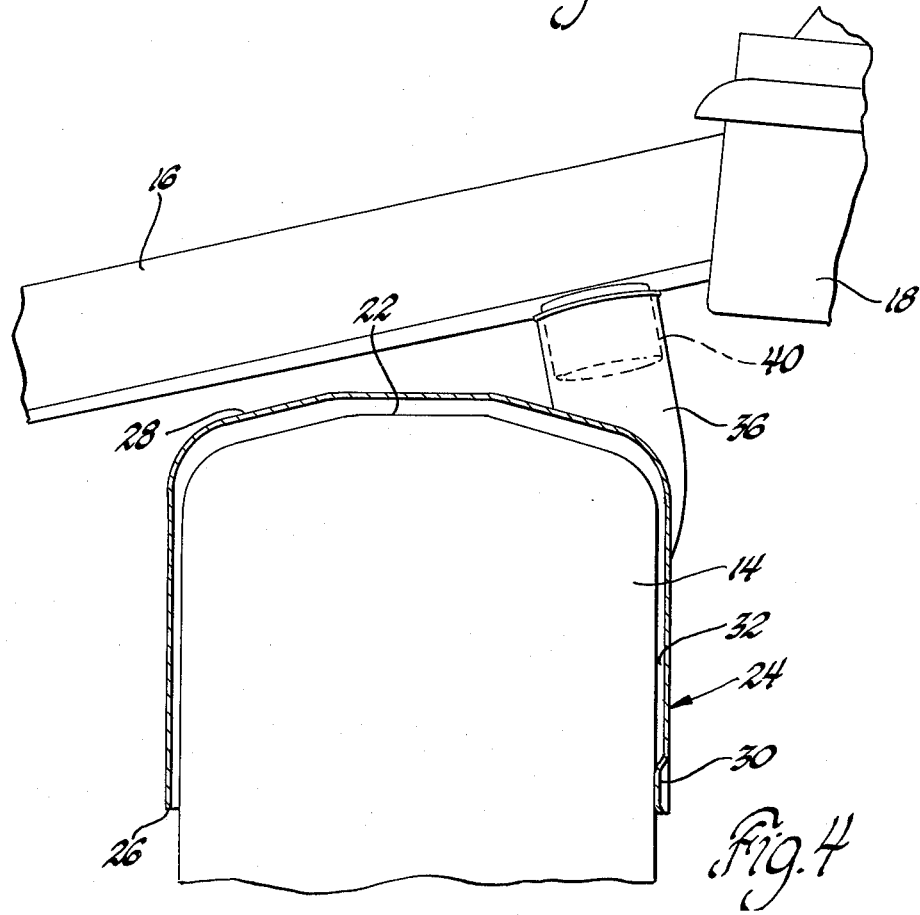

CARBURETED AIR PREHEATER STOVE

This invention relates to a carburetor air preheater stove and more particularly to such a stove that fits over a catalytic converter.

It is common practice to use a stove that is arranged about the exhaust manifold of an internal combustion engine to preheat air prior to delivery to the carburetor during the engine warm-up period to obtain good vaporization of the fuel during this period. Typically, these stoves are secured by bolts or other conventional fasteners to the engine and because of the typical exhaust manifold outline are limited to using substantially less than the full heat transfer surface area available unless resort is made to complicated stove configurations.

I have found that on an internal combustion engine having a can type catalytic converter secured up close to the engine directly to the exhaust manifold, a can type stove with special provisions can be fitted substantially fully over the converter with a predetermined air space therebetween and retained without requiring securing fasteners. The stove is provided with dimples which position and firmly hold it on the converter while maintaining an annular air space along the converter side which is open at one end to atmosphere and at the opposite end to air space between closed ends of the stove and converter. The latter space is connected by a short tube to the air horn of the carburetor's air cleaner. The stove is made to extend along almost the full length of the converter and atmospheric air entering the stove through its open lower end passes upwardly about the converter and then over the closed end thereof to the stove outlet tube and thus the air is passed over a very large heated surface area to assure that it is heated a substantial amount before delivery to the carburetor. The disclosed embodiment shows the stove according to the present invention used on an internal combustion engine of the rotary type with an up-close catalytic converter; however, it will be understood that the use of the stove is not limited to rotary engines and could be used on other type engines with a similar converter arrangement.

An object of the present invention is to provide a new and improved carburetor air preheater stove.

Another object is to provide for an internal combustion engine with an up-close can type catalytic converter, a can type stove that fits over the converter and is secured without requiring fasteners and directs fresh air over a large portion of the converter's external surface and then into the engine's carburetor.

Another object is to provide on an internal combustion engine having an up-close can type catalytic converter a can type carburetor preheater stove that is spaced with clearance about the converter by simply formed portions on the stove which also hold it in place without requiring fasteners, and that directs fresh air along most of the length of the converter and thence through a short tube to the air inlet of the engine's carburetor.

These and other objects of the present invention will be more apparent from the following description and drawing in which:

FIG. 2 is an enlarged view taken along the line 2—2 in FIG. 1.

FIG. 3 is a view taken along the line 3—3 in FIG. 2.

FIG. 4 is a view taken along the line 4—4 in FIG. 2.

Figure 1:
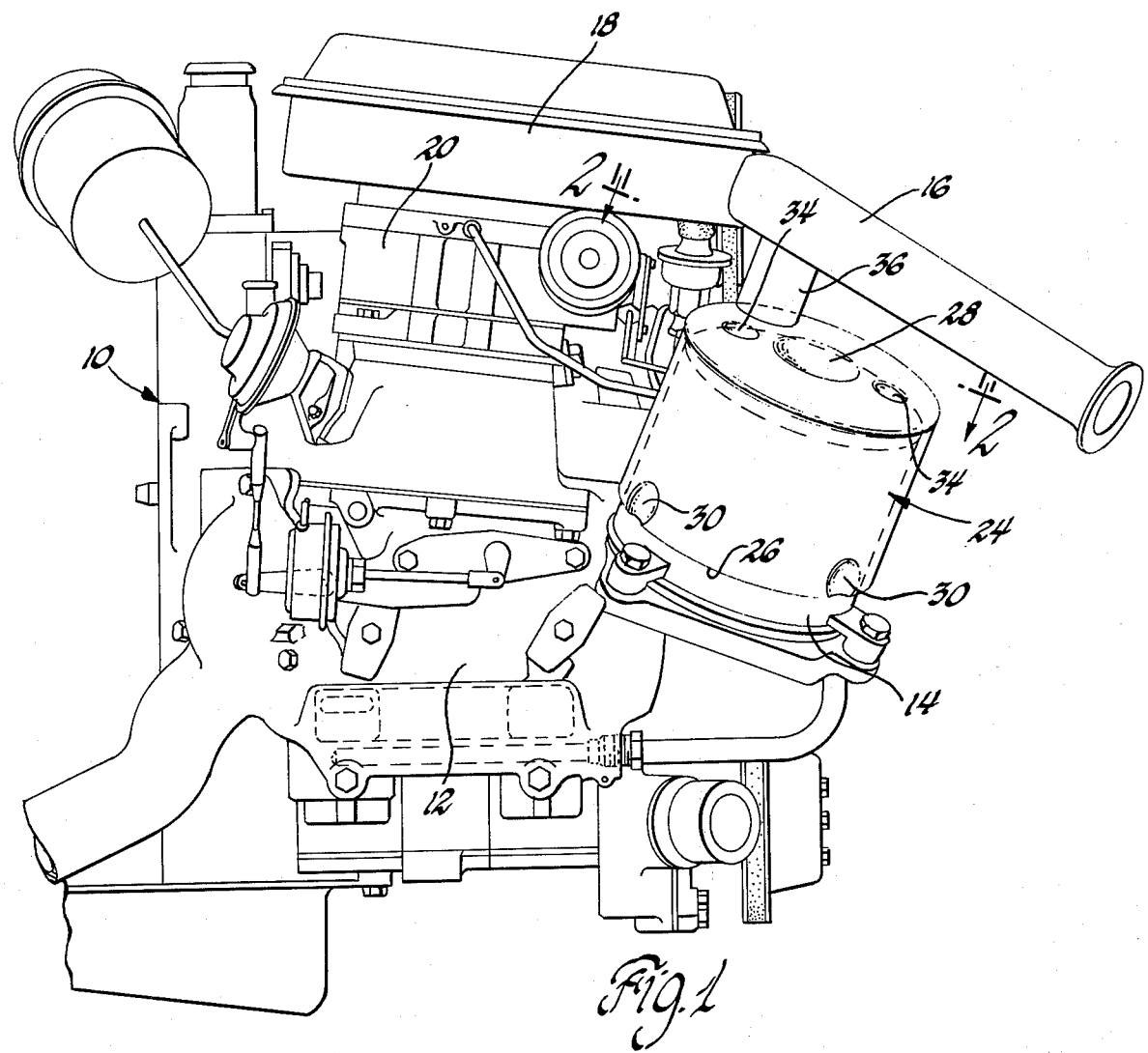
FIG. 1 is a carburetor and exhaust side elevational view of an internal combustion rotary engine having a converter on which is mounted a carburetor air preheater stove constructed according to the present invention.

The carburetor air preheater stove according to the present invention is shown in use on an internal combustion rotary engine 10 of the type disclosed in detail in copending U.S. application Ser. No. 389,112, filed Aug. 17, 1973 and assigned to the assignee of this invention, having an exhaust manifold 12 with a can type ctalytic converter 14 mounted thereon of the type disclosed in detail in copending U.S. application Ser. No. 521,948, filed Nov. 8, 1974 and assigned to the assignee of this invention. In operation, the engine 10 intakes air through a tubular air horn 16 of an air cleaner 18 mounted on the engine's carburetor 20 and exhausts to the manifold 12 where the catalytic converter 14 operates to lower emission of undesirable exhaust gas constituents. As best shown in FIGS. 1 and 4, the converter 14 has a cylindrical shape which extends up close along side the engine with its longitudinal axis transverse to the air horn 16 and has a closed end or top 22 located proximate and underneath the air cleaner's air horn 16.

According to the present invention, advantage is taken of the catalytic converter 14 and its proximity to the air horn 16 as compared with the remoteness of the exhaust manifold 12 to provide a heat source for preheating intake air to the engne. This is accomplished with a cylindrical stove 24 formed of sheet metal which is open at one end 26 and closed at the other end 28 as best shown in FIGS. 3 and 4. The stove 24 has a predetermined larger internal diameter than the external diameter of the converter 14 as best shown in FIG. 2 and a predrtermined length close to that of the converter as best shown in FIG. 1. The stove 24 fits over the converter 14 with an air space 32 left therebetween and has at least three angularly spaced radially inwardly extending dimples or integral projections 30 at its lower end 26 which have a press fit with the side of the converter as shown in FIGS. 2 and 4. The dimples 30 maintain the air space annular between the stove and the converter along the opposing sides thereof and also firmly secure the stove to the converter. In addition, the stove top 28 has two diagonally opposite inwardly extending dimples or integral projections 34 which engage the closed upper converter end 22 to maintain a cylindrical air space between the closed upper ends of the converter and stove as shown in FIGS. 2, 3 and 4. A tube 36 is welded to the closed upper stove end 28 and receives a downwardly projecting nipple 40 on the air horn 16 close to where it joins with the air cleaner 18 to thus provide communication between the top of the stove and the carburetor intake as best shown in FIGS. 1, 2 and 4.

On engine start-up, the converter 14 heats very rapidly and the engine vacuum forces the stove 24 to draw in atmospheric air through the open lower end into the air space 32 where it then passes longitudinally of the hot converter and then past the closed upper end thereof and thence through the tube 36 and the air horn 16 into the carburetor. Thus with a very simple stove arrangement, advantage is taken of a large existing heated surface area as provided by the up-close catalytic converter to preheat the air prior to delivery to the engine. In addition, the stove is very simply installed without requiring fasteners. A further advantage in addition to preheating intake air is that the stove by almost completely surrounding the converter also acts as an insulator to insulate the engine compartment from converter heat.

The above described embodiment is illustrative of the invention which may be modified within the scope of the appended claims.

I claim:

1. An internal combustion engine having a carburetor and an exhaust manifold, said carburetor having an air cleaner with an air horn extending outwardly therefrom, a catalytic converter having a lower end connected to said exhaust manifold and a closed upper end proximate said air horn, and a stove having an open end and a closed end fitting over said converter a substantial longitudinal distance with air space therebetween and with said open stove end adjacent said lower converter end and said closed stove end opposite said closed upper converter end, said stove having angularly spaced radially inwardly extending integral projections having a press-fit with the exterior of said converter to maintain the air space annular between opposing sides of said stove and said converter and also to secure said stove to said converter, said closed stove end having an inwardly extending integral projection engaging said closed upper converter end to maintain the air space between the closed ends of said converter and stove, and a tube connecting said closed upper stove end to said air horn whereby said stove draws in atmospheric air through said open lower end and then longitudinally of said converter through said annular air space and then past the closed upper end of said converter with the thus heated air thereafter directed into said carburetor.

2. An internal combustion engine having a carburetor and an exhaust manifold, said carburetor having an air cleaner with an air horn extending outwardly therefrom, a cylindrical catalytic converter having its longitudinal axis extending transverse to said air horn and having a lower end connected to said exhaust manifold and a closed upper end proximate said air horn, and a cylindrical sheet metal carburetor air preheater stove of larger diameter than said converter having an open end and a closed end, said stove fitting over said converter a substantial longitudinal distance with air space therebetween and with said open stove end adjacent said lower converter end and said closed stove end opposite said closed upper converter end, said stove having at least three angularly spaced radially inwardly extending integral projections having a press-fit with the exterior of said converter to maintain the air space annular between opposing sides of said stove and said converter and also to secure said stove to said converter, said closed stove end having at least one inwardly extending integral projection engaging said closed upper converter end to maintain the air space between the closed ends of said converter and stove, and a tube connecting said closed upper stove end to said air horn whereby said stove draws in atmospheric air through said open lower end and then longitudinally of said converter through said annular air space and then past the closed upper end of said converter with the thus heated air thereafter directed into said carburetor.

* * * * *